United States Patent Office 3,085,448
Patented Apr. 16, 1963

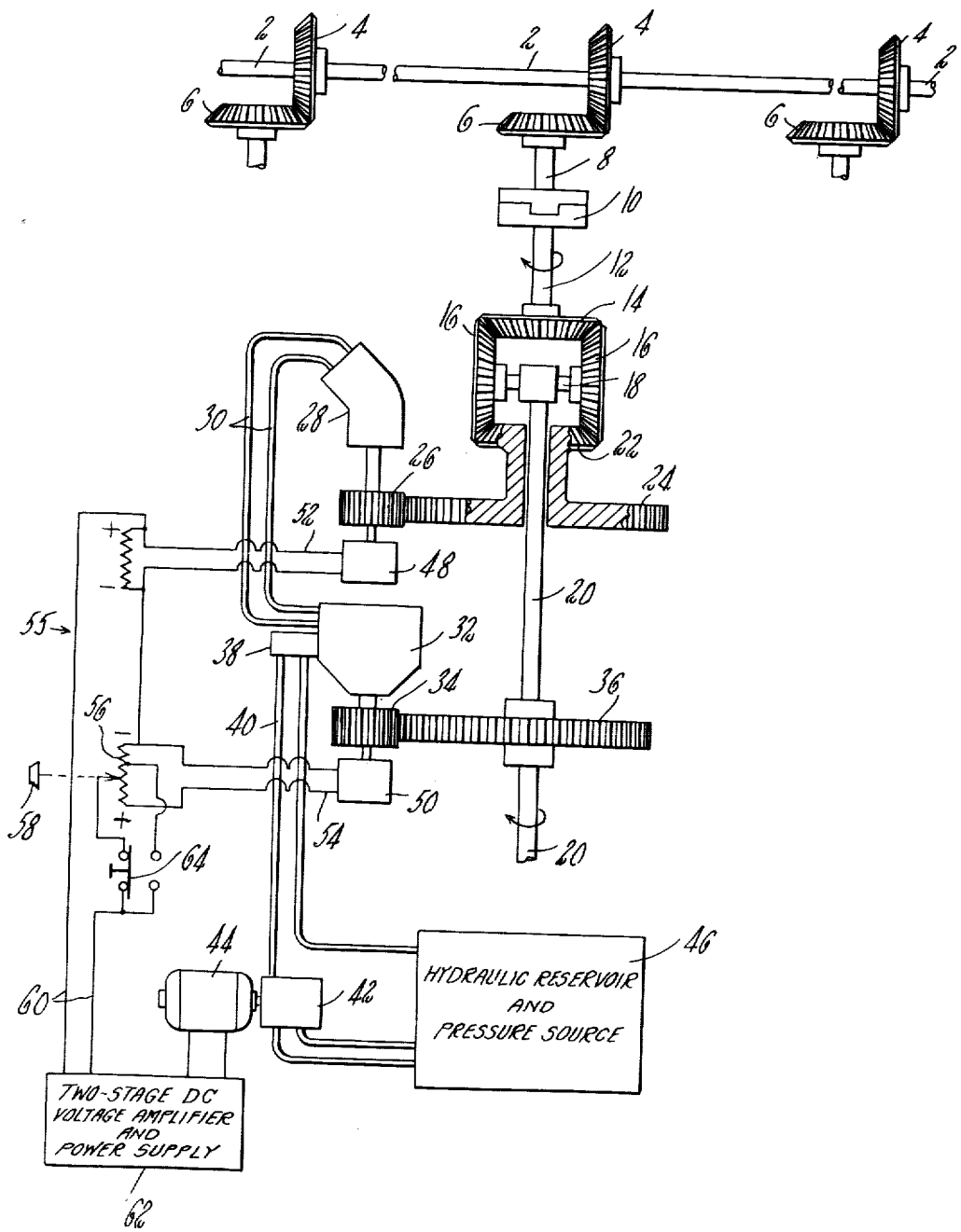

3,085,448
CONTROLLED DIFFERENTIAL DRIVE
Frank S. Finlayson, Worcester, Mass., assignor to Rice Barton Corporation, Worcester, Mass., a corporation of Massachusetts
Filed Dec. 29, 1961, Ser. No. 164,221
8 Claims. (Cl. 74—687)

This invention relates to differential drives of a mechanical nature for paper making machines and the like, and particularly to apparatus for accurately controlling and maintaining the speed of various sections of such drives. More specifically this invention relates to drives wherein there is a common line shaft powering several sections of a machine, which sections must be maintained at speeds differing from that of the line shaft and from each other to a desired degree, and to adjustable controls for maintaining a preselected speed differential between the common line shaft and one or more sections.

In paper making machinery, power from a main or common line shaft is provided to a series of drives for sections of the machine, which may include such things as Fourdriniers, pressers, driers, calenders, coaters and the like. Each section may require a driven speed different from the others because of the particular process step performed at that section, and the paper web may expand or contract. Because of this, the driving arrangements for the various sections of the machine should be controlled or controllable so that a fine degree of adjustment may be maintained between the drives for adjacent sections in order to prevent either overdrawing or production of slack in the paper web. At times an overriding control may be desirable for the drive between various sections of the paper making machine in order to take care of accumulated excess paper between the sections. In modern high speed paper making machines, the accuracy of controls used for the drive and their rapidity of response in any given situation are of extreme importance.

One object of the present invention is to provide a drive and control which is relatively inexpensive, compact and dependable, capable of handling high horse power driving situations at high speeds.

Another object is to provide a sectional control which has a high degree of uniformity and accuracy in the maintenance of a preselcted speed ratio with respect to the line shaft speed and the speed of adjacent sections.

A further object of the invention is to provide an overriding emergency control which is rapid in response when used, and in which return to the normal preselected speed ratio is also rapid and accurate.

Another object of the invention is to provide a control capable of being easily altered while the machine is running so as to adjust a particular section or sections of a machine to reflect unpredictable changes in the length of a paper web after a run has been started.

These and other objects of the invention are met generally by providing an epicyclic gear train at each section of the machine, driven by a single line shaft, common to several sections of the machine. Each sectional gear train includes one main driving input gear element, means connecting a second gear element to the input gear and to an output shaft for the section, and a variable speed driving means connected to drive a third gear element to control the relative speed of the second gear element with respect to the first. According to this invention there is provided further electrically actuated hydraulically powered means for regulating the speed of said variable driving means in accordance with changes of relative speed between the output shaft and the third gear element, thereby producing a constant speed differential between the input shaft gear and the output shaft.

Other objects and further details of that which is believed to be novel and included in this invention will be clear from the following description and claims, taken with the accompanying drawing in which is illustrated an example of drive and control embodying the present invention.

In the single FIGURE of the drawing there is shown a simplified diagrammatic view or layout of the mechanical driving elements, with hydraulic and electrical control system, for one section of an exemplary paper making machine according to the invention.

In a drive for the complete machine, a common line shaft 2 extends alongside the machine, being driven rotatably by a suitable source of power (not shown). This line shaft serves several drive arrangements for different sections of the machine, it being desired usually that each section be driven at a rate different from that of the line shaft and different from that of other sections of the machine, according to predetermined ratios depending upon the character of the web being treated in each section and the particular operation being performed in each section. The individual section drives each obtain their power from a line shaft gear 4 each of which meshes with a sectional drive gear 6 on a drive shaft 8 positioned at right angles to the line shaft. A suitable clutch 10 may be used to connect or disconnect the drive shaft, when desired, with the input shaft 12 for each section of the machine, the input shaft leading to and being connected with the differential gear assembly or train. This assembly is an epicyclic gear train shown here as a symmetrical planetary gear system consisting of a primary sun gear 14 fixed on the input shaft, meshing with a pair of planet gears 16 which are coupled together and carried rotatably on the ends of a planet gear carrier or frame 18. The planet gear carrier element is fastened to and rotates together with an output shaft 20, driving one section of the machine.

The coupled planet gears 16 also mesh with a secondary sun gear 22 which is mounted for rotation symmetrically opposite the primary sun gear 14. With a given speed of rotation of the input shaft and its primary sun gear, the speed of relative opposite rotation of the secondary sun gear determines the relative rotative speed of the planet gears, the resulting revolution of carrier 18 and hence the speed of rotation of the output shaft 20. The speed of the second sun gear is controlled by adjustment of the amount of power which is allowed to flow from this gear to the planetary gears and output shaft. Immediate control of this power flow is accomplished by means of an hydraulic transmission described below.

A first control gear 24, secured to and rotatable with secondary sun gear 22, and one or more other gears 26 constituting a speed increasing gear train connect this sun gear to the driving shaft of a fixed displacement hydraulic pump 28. The pump 28 in turn is connected through a closed hydraulic circuit 30 with a variable displacement hydraulic motor 32. The driven shaft of the hydraulic motor is connected through one or more gears 34 to a second control gear 36 on the output shaft, this gearing constituting a speed reducing train to the output shaft.

Selection and control of a desired ratio of output to input in the drive is made by adjustment of the displacement of the motor. This displacement controls the amount of hydraulic fluid that may be delivered by the pump per revolution. Because the pump is of fixed displacement, it is forced to rotate at such speed as will deliver the amount of fluid required by the motor displacement. The motor acts as a meter or valve controlling the pump. A change in pump speed, and hence change in the speed of the second sun gear, induces a change in the output shaft speed. The hydraulic motor being connected to the output shaft rotates at a speed proportional to the speed of that shaft.

An important feature of this drive and control is that a change in the motor displacement and corresponding change in pump speed leads to an opposite change in the speed of the output shaft which in turn controls the flow through the motor at a given displacement. The effect of this arrangement is to reduce the factor of proportionality between change of motor displacement and change of output shaft speed so that any error in the setting of the motor displacement produces a much smaller error in the desired rates of the input shaft speed to the output shaft speed for the drive.

By establishing gear ratios between the second sun gear, and the pump, and between the hydraulic motor and the output shaft, such that the secondary sun gear rotates at a fraction of the speed of the input shaft sun gear, the amount of power transmitted through the hydraulic transmission is a corresponding fraction of that transmitted through the drive proper. Such an arrangement allows the use of hydraulic components of much smaller horsepower capacity than the horsepower capacity of the drive as a whole. Except for conventional auxiliary units of nominal horsepower (not shown) which may supply hydraulic fluid to make up for leakage in the closed hydraulic circuit between the hydraulic pump and motor and to activate hydraulic servo controls, no supplementary power is introduced into the drive, and except for nominal friction losses, no power is dissipated at the drive. The primary source of power is the line shaft.

Regulation of the displacement of the hydraulic motor is by means of an hydraulically actuated control cylinder 38 such as is commonly used to control variable displacement hydraulic motors. Fluid supplied through a control line 40 to the control cylinder is regulated by a precise servo valve 42 which is actuated by an electric torque motor 44. Fluid and pressure for the hydraulic system are supplied from a suitable source 46.

The hydraulic pump and hydraulic motor are geared to direct current electric tachometers 48 and 50 respectively, which may be compensated for ambient temperature variations. Electrical outputs 52 and 54 of the tachometers lead to a mixer circuit 55 which is adjustable as by a potentiometer 56 having a control knob 58 so as to cause a flow of current to line 60 only when the tachometers are driven at other than a selected ratio of speeds. Current from the mixer circuit is electronically amplified as by a suitable two stage D.C. voltage amplifier 62 and is used to activate the electric torque motor 44 at the servo valve.

Necessary power for the amplifier and torque motor is supplied at the amplifier. Adjustment of the mixer circuit, and hence the ratio of output to input speeds of the drive, is normally by means of the potentiometer control knob 58 on one branch of the mixer circuit which knob is located at a position convenient to the machine attendant. This manual control optionally may be replaced by mechanism operated by punched cards or similar pre-set devices, so as to establish previously determined desirable speed ratios.

For temporary changes in speed and return to a preselected set ratio, such as would be required to take up slack in a sheet passing through the driven machine, a push button switch 64 is provided to temporarily unbalance the mixer circuit and cause a change in the speed ratio during such time as the attendant activates the switch. Upon release of the switch the preselected mixer circuit setting is restored and the speed ratio returns rapidly and accurately to the previously established value. An advantage of the electronic control for this operation is that the response is much more rapid than that of mechanical or hydraulic devices which, through delay in returning the drive to the proper ratio for continuous running, make it difficult to achieve the optimum degree of sheet tension in a paper web passing through a machine.

It should be noted that the establishment and automatic maintenance of a given speed ratio for the drive is independent of load and temperature or other such factors which would tend to affect the relative speeds of the hydraulic pump and motor. This results from the fact that the input to the electronic control circuit is established by the ratio of shaft speeds as measured by the electric tachometers.

An additional factor leading to precision in this control is the basic gearing arrangement of the drive which results in a percentage error in the drive ratio of less than one-eighth of any error which may exist in the ratio of the speed of the hydraulic pump and motor. Since the tachometer speeds are proportional to the hydraulic pump and motor speeds any error, however small, in the tachometer output and reaction at the hydraulic motor displacement control will reflect as a much smaller error in the speed ratio of the drive.

Torque input to the drive is directly proportional to the torque which acts upon the hydraulic pump. Since this pump is of a fixed displacement, the pressure that it produces in the hydraulic transmission circuit is directly proportional to the torque input to the drive. A conventional pressure indicator in the hydraulic circuit (not shown) may be provided to indicate to the machine attendant the torque input to the machine section driven by the drive unit, thus making it possible for him to select and establish desired sheet tension or to proportion the drive load equitably among several drives which serve a given machine.

As will be evident from the foregoing, certain aspects of this invention are not limited to the precise details set forth as an example, and it is contemplated that various and other modifications and applications of the invention will occur to those skilled in the art. It is therefore intended that the appended claims shall cover such modifications and applications as do not depart from the true spirit and scope of the invention.

What is claimed as new and is desired to be secured by Letters Patent of the United States is:

1. In a paper making machine and the like a power transmitting device having a rotating line shaft and a series of driven section shafts each to be rotated at a speed proportional to line shaft speed,
   a variable differential drive unit for driving each driven section shaft from the line shaft,
   each drive unit comprising an input shaft,
   means for coupling said input shaft to the line shaft for driving said input shaft at a speed directly proportional to line shaft speed,
   an output shaft constituting the driven section shaft,
   an epicyclic gear train between said input and output shafts incorporating
   a ratio-controlled element therein which determines the difference in rotative speed between said input shaft and said output shaft,
   means for controlling the ratio of rotation of said output shaft with respect to said controlling element, and
   means actuated by rotation of said output shaft and said controlling element for governing the action of said means for controlling said ratio.

2. In a paper making machine and the like having a rotating line shaft and a series of driven section shafts each to be rotated at a speed proportional to line shaft speed,
   a variable differential drive unit for driving each driven section shaft from the line shaft,
   each drive unit comprising an input shaft,
   means for coupling said input shaft to the line shaft for driving said input shaft at a speed directly proportional to line shaft speed,
   an output shaft constituting the driven section shaft,
   an epicyclic gear train between said input and output shafts incorporating
   a ratio-controlling element therein which determines the difference in rotative speed between said input shaft and said output shaft, a hydraulic system for controlling the ratio of rotation of said output shaft with respect to said controlling element, and an electrical circuit governing the action of said hydraulic system for settably varying said ratio between desired values, said circuit being actuated by rotation of said output shaft and said controlling element.

3. In a paper making machine and the like having a rotating line shaft and a series of driven section shafts each to be rotated at a speed proportional to line shaft speed, a variable differential drive unit for driving each driven section shaft from the line shaft, each drive unit comprising an input shaft, means for coupling said input shaft to the line shaft for driving said input shaft at a speed directly proportional to line shaft speed, an output shaft constituting the driven section shaft, an epicyclic gear train between said input and output shafts incorporating a ratio-controlling element therein which determines the difference in rotative speed between said input shaft and said output shaft, means for controlling the ratio of rotation of said output shaft with respect to said controlling element, including a fixed displacement hydraulic pump in driving connection with said controlling element, a variable displacement hydraulic motor in driving connection with said output shaft a closed hydraulic system connecting said pump and said motor, to control said pump speed by variations in motor displacement, electrical control means governing the action of said hydraulic system for settably varying the displacement of said motor infinitely between desired values, including a current producing tachometer on said pump and a current producing tachometer on said motor, a mixing circuit connecting said tachometers and settable to produce a corrective output voltage difference between currents produced by said tachometers and a torque motor actuated by output voltage from said mixing circuit, and an hydraulic servo valve driven by said torque motor for varying the displacement of said hydraulic motor in accordance with actuation of said torque motor.

4. In a machine having a rotating line shaft and a series of driven section shafts each to be rotated at a speed proportional to line shaft speed, a variable differential drive unit for driving each driven section shaft from the line shaft, each drive unit comprising an input shaft, means for coupling said input shaft to the line shaft for driving said input shaft at a speed directly proportional to line shaft speed, an output shaft constituting the driven section shaft, a gear train including an input gear element connected to said input shaft, a planetary gear element meshing with said input gear element a rotative planetary gear carrier rotatably supporting said planetary gear element and connected to said output shaft, a rotative ratio-controlling gear element meshing with said planetary gear element opposite said input gear element to revolve said planetary gear element and its carrier between said input and said controlling gear elements and determine the difference in rotative speed between said input gear element on said input shaft and said planetary gear carrier and its connected output shaft, means for controlling the ratio of rotation of said output shaft with respect to said controlling gear element, and means actuated by rotation of said output shaft and said controlling gear element for governing the action of said means for controlling said ratio.

5. In a machine having a rotating line shaft and a series of driven section shafts each to be rotated at a speed proportional to line shaft speed, a variable differential drive unit for driving each driven section shaft from the line shaft, each drive unit comprising an input shaft, means for coupling said input shaft to the line shaft for driving said input shaft at a speed directly proportional to line shaft speed, an output shaft constituting the driven section shaft, a gear train including an input gear element connected to said input shaft, a planetary gear element meshing with said input gear element, a rotative planetary gear carrier rotatably supporting said planetary gear element and connected to said output shaft, a rotative ratio-controlling gear element meshing with said planetary gear element opposite said input gear element to revolve said planetary gear element and its carrier between said input and said controlling gear elements and determine the difference in rotative speed between said input gear element on said input shaft and said planetary gear carrier and its connected output shaft, an hydraulic system for controlling the ratio of rotation of said output shaft with respect to said controlling gear element, and an electrical circuit governing the action of said hydraulic system for settably varying said ratio between desired values, said circuit being actuated by rotation of said output shaft and said controlling gear element.

6. In a machine having a rotating line shaft and a series of driven section shafts each to be rotated at a speed proportional to line shaft speed, an infinitely variable differential drive unit for driving each driven section shaft from the line shaft, each drive unit comprising an input shaft, means for coupling said input shaft to the line shaft for driving said input shaft at a speed directly proportional to line shaft speed, an output shaft consistuting the driven section shaft, a gear train including an input gear element connected to said input shaft, a planetary gear element meshing with said input gear element, a rotative planetary gear carrier rotatably supporting said planetary gear element and connected to said output shaft, a rotative ratio-controlling gear element meshing with said planetary gear element opposite said input gear element to revolve said planetary gear element and its carrier between said input and said controlling gear elements and determine the difference in rotative speed between said input gear element on said input shaft and said planetary gear carrier and its connected output shaft, means for controlling the ratio of rotation of said output shaft with respect to said controlling gear element, including a fixed displacement hydraulic pump in driving connection with said controlling gear element, a variable displacement hydraulic motor in driving connection with said output shaft a closed hydraulic system connecting said pump said motor, to control said pump speed by variations in motor displacement, electrical control means governing the action of said hydraulic system for settably varying the displacement of said motor infinitely between desired values, including a current producing tachometer on said pump and a current producing tachometer on said motor, a mixing circuit connecting said tachometers and settable to produce a corrective output voltage difference between currents produced by said tachometers and a torque motor actuated by output voltage from said mixing circuit, and an hydraulic servo valve driven by said torque motor for varying the displacement of said hydraulic motor in accordance with acuation of said torque motor.

7. A differential drive unit as claimed in claim 3, including overriding control means for optionally interrupting the setting of said mixer circuit and actuating said torque motor to change the displacement of said hydraulic motor while said overriding control means is operated.

8. A differential drive unit as claimed in claim 6, including a manually operable control switch in said mixer circuit for altering the set output voltage from said mixer circuit and, when operated, actuating said torque motor to change the displacement of said hydraulic motor through operation of said servo-valve.

References Cited in the file of this patent

UNITED STATES PATENTS

| | | |
|---|---|---|
| 2,485,126 | Wood | Oct. 18, 1949 |
| 2,648,502 | Trofimov | Aug. 11, 1953 |

UNITED STATES PATENT OFFICE
CERTIFICATE OF CORRECTION

Patent No. 3,085,448                          April 16, 1963

Frank S. Finlayson

It is hereby certified that error appears in the above numbered patent requiring correction and that the said Letters Patent should read as corrected below.

Column 1, line 45, for "preselcted" read -- preselected --; column 6, line 50, for "consistuting" read -- constituting --; line 75, after "pump" insert -- and --; column 7, line 17, for "acuation" read -- actuation --.

Signed and sealed this 19th day of November 1963.

(SEAL)
Attest:

ERNEST W. SWIDER                          EDWIN L. REYNOLDS

Attesting Officer                       Acting Commissioner of Patents